(12) United States Patent
Lasko

(10) Patent No.: US 10,846,055 B2
(45) Date of Patent: Nov. 24, 2020

(54) CIRCUITS AND DEVICES ADDING BINARY OPERANDS BASED ON VARIABLE QUANTITY

(71) Applicant: Andrew Lasko, Banning, CA (US)

(72) Inventor: Andrew Lasko, Banning, CA (US)

( * ) Notice: Subject to any disclaimer, the term of this patent is extended or adjusted under 35 U.S.C. 154(b) by 0 days.

(21) Appl. No.: 16/100,135

(22) Filed: Aug. 9, 2018

(65) Prior Publication Data

US 2020/0104099 A1    Apr. 2, 2020

(51) Int. Cl.
*G06F 7/505*    (2006.01)

(52) U.S. Cl.
CPC .................... *G06F 7/505* (2013.01)

(58) Field of Classification Search
CPC ........................................................ G06F 7/505
USPC ..................... 708/3, 700–714, 801
See application file for complete search history.

(56) References Cited

U.S. PATENT DOCUMENTS

| | | | | |
|---|---|---|---|---|
| 4,859,930 A | * | 8/1989 | Schouwenaars | .... H01L 27/0229 323/317 |
| 5,140,538 A | * | 8/1992 | Bass | ........................ G06J 1/00 327/535 |

\* cited by examiner

*Primary Examiner* — Tan V Mai
(74) *Attorney, Agent, or Firm* — Nwamu, P.C.

(57) ABSTRACT

An adding circuit, device and method for adding M binary operands/numbers. The binary operand (i) of the M binary operands has Ni bits. First, for i=1, . . . , M and j=1, . . . , Ni, the bit (i,j) is applied to a switch (i,j) that might be on if the bit (i,j) is 1, and off if the bit (i,j) is 0. Then a direct current (i,j) is sent through the switch (i,j), the direct current (i,j) having a value of (a) $2^{j-1}$ if the switch (i,j) is on, and (b) zero if the switch (i,j) is off. All the direct currents (i,j) with their self-summing capabilities are merged into a combined current on an electrically conductive line. An ammeter on the electrically conductive line displays the decimal value of the sum of the M binary operands.

20 Claims, 3 Drawing Sheets

CIRCUITS AND DEVICES ADDING BINARY OPERANDS BASED ON VARIABLE QUANTITY

BACKGROUND OF THE DISCLOSURE

The present disclosure relates generally to adder circuits and devices and more specifically to adder circuits and devices adding binary operands based on variable quantity.

The addition of two N-bit binary numbers (N being a positive integer) require N full adders; moreover, the full adders are typically cascaded in series. That is, the carry of a prior full adder is input into the subsequent full adder stage. Such conventional circuitry can become complex particularly when the binary numbers to be added have a higher number of bits, which would require additional full adders for the computation.

It is thus within the aforementioned context that a need for the present disclosure has arisen.

SUMMARY OF THE DISCLOSURE

Various aspects of an adding circuit and device that add binary operands based on a variable quantity can be found in exemplary embodiments of the present disclosure.

In one embodiment, the adding circuit includes an ammeter that displays the sum of computing the sum of one or two or more binary operands. The ammeter is coupled to an electrically conductive line. The electrically conductive line is itself coupled to M operand portions (i), i=1, . . . , M. For each of i=1, . . . , M, the operand portion (i) includes Ni branches (i,j), j=1, . . . , Ni, wherein Ni is an integer greater than 0, and depends upon the number of bits in a binary operand.

All of the branches (i,j), i=1, . . . , M and j=1, . . . , Ni, are in parallel with each other. For i=1, . . . , M and j=1, . . . , Ni, the branch (i,j) includes a current source (i,j) and a switch (i,j) that are in series. The current source (i,j) can send a direct current (i,j) through the switch (i,j) to the electrically conductive line through to the ammeter. In one embodiment, the direct current (i,j) has an amperage unit value of $2^{j-1}$ when the switch (i,j) is on, and zero when the switch (i,j) is off. Thus, in accordance with advantages of the present invention, the amperage values of the current sources (i,j) are in binary progression (X, 2X, 4X, 8X) beginning with the current source (i,j) having the lowest detectable amperage X. The remaining current sources (i,j) providing outputs that increase in binary progression (2X, 4X, 8X).

The switch (i,j) may be a transistor (i,j) or a mechanical switch (i,j), for example. An Analog to Digital Conversion (ADC) circuit that is connected to all of the branches (i,j), i=1, . . . , M and j=1, . . . , Ni, via the electrically conductive line may be employed. The ADC circuit might generate a binary output equal to the decimal value of the current flowing through the ADC circuit.

According to another embodiment, a method for adding M binary operands, where M is greater than 0, is disclosed. Here, the M binary operands include binary operands (i), i=1, . . . , M, wherein for i=1, . . . , M, the binary operand (i) has Ni bits including bits (i,j), j=1, . . . , Ni, from right to left, wherein Ni is an integer greater than 0.

The method includes, for i=1, . . . , M and j=1, . . . , Ni, applying the bit (i,j) to a switch (i,j). This switch (i,j) is on when the bit (i,j) is 1, and off when the bit (i,j) is 0. The method also includes for i=1, . . . , M and j=1, . . . , Ni, sending a direct current (i,j) through the switch (i,j). The direct current (i,j) has an amperage unit value of $2^{j-1}$ when the switch (i,j) is on, and zero when the switch (i,j) is off. The method also merges all of the direct currents (i,j), i=1, . . . , M and j=1, . . . , Ni into a combined current on an electrically conductive line.

According to an embodiment, for i=1, . . . , M and j=1, . . . , Ni, the direct current (i,j) is sent using a current source (i,j) that is connected to the switch (i,j) and can send a current having an amperage unit value of $2^{j-1}$. The method further includes using an ammeter to receive the combined current from the electrically conductive line, and to display a decimal value of the combined current in the same amperage unit. According to an embodiment, M=2 and N1=N2.

According to another embodiment, a method for adding M binary operands based on a variable in a variable unit is disclosed. The M binary operands include binary operands (i), i=1, . . . , M. For i=1, . . . , M, the binary operand (i) has Ni bits including bits (i,j), j=1, . . . , Ni, from right to left, where Ni is an integer greater than 0.

The method includes, for i=1, . . . , M and j=1, . . . , Ni, applying the bit (i,j) to a switch (i,j) where the switch (i,j) is on if the bit (i,j) is 1, and off if the bit (i,j) is 0. For i=1, . . . , M and j=1, . . . , Ni, the method moves a quantity (i,j) of the variable through the switch (i,j). The quantity (i,j) has a value of $2^{j-1}$ in the variable unit if the switch (i,j) is on, and zero if the switch (i,j) is off. The method merges all the quantities (i,j), i=1, . . . , M and j=1, . . . , Ni, into a combined quantity of the variable in the variable unit.

According to an embodiment, the method further includes using a meter to receive the combined quantity of the variable and display a decimal value of the combined quantity of the variable in the variable unit. According to an embodiment, the variable is liquid flow rate. For i=1, . . . , M, and j=1, . . . , Ni, the switch (i,j) comprises a valve (i,j). For i=1, . . . , M, and j=1, . . . , Ni, the quantity (i,j) of the variable is moved by using a liquid pump (i,j) that can pump at liquid flow rate unit of $2^{j-1}$.

Among other advantages, the present disclosure provides an adding circuit, device and method for rapidly computing the sum of binary operands while significantly reducing circuit components.

DETAILED DESCRIPTION OF THE DISCLOSURE

Reference will now be made in detail to the embodiments of the invention, examples of which are illustrated in the accompanying drawings. While the invention will be described in conjunction with the one embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

Figure 1:
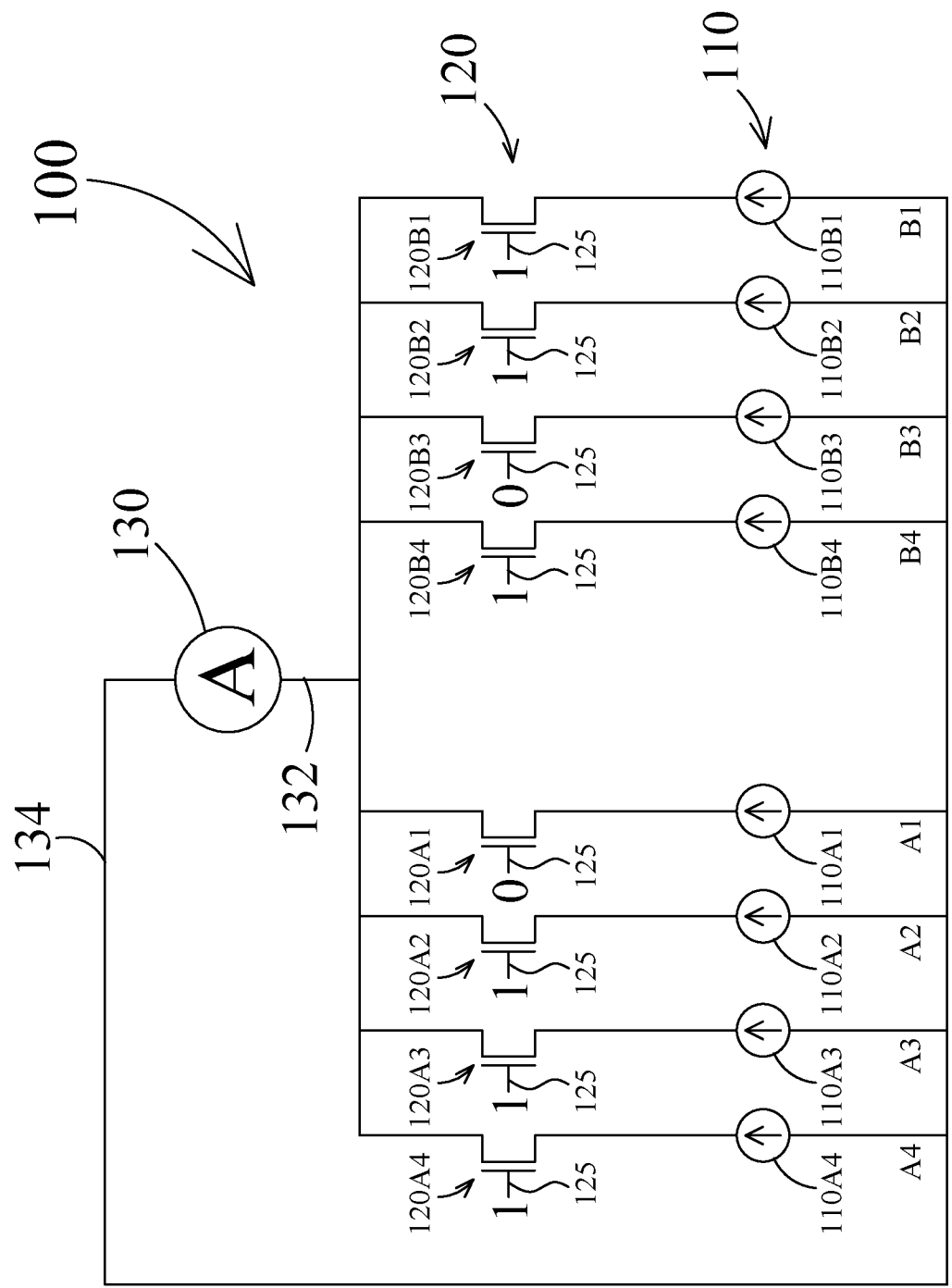
FIG. 1 illustrates an adding circuit in accordance with embodiments of the present disclosure.

FIG. 1 illustrates an adding circuit 100 in accordance with embodiments of the present disclosure.

In FIG. 1, adding circuit 100 includes a number of current sources 110. The current sources are current source 110A4 and current source 110A3. Other included current sources are current source 110A2 and current source 110A1. Current sources 110 also include current source 110B4, current source 110B3, current source 110B2 and current source 110B1.

As shown, adding circuit 100 also comprises a number of transistors 120. The transistors are transistor 120A4 and transistor 120A3. Additional transistors are transistor 120A2 and transistor 120A1. Transistors 120 also include transistor 120B4, transistor 120B3, transistor 120B2 and transistor 120B1.

In FIG. 1, adding circuit 100 also includes an ammeter 130. Although not shown, other components known to those of ordinary skill in the art may be included.

Here, in FIG. 1, the first current source, i.e., current source 110A4 and transistor 120A4 are electrically connected. Transistor 120A4 is then electrically coupled to ammeter 130 via an electrically conductive line 132. Ammeter 130 is electrically connected via a return line 134 to current source 110A4.

The remaining current sources 110 and transistors 120 are electrically coupled to ammeter 130 in a similar manner. Specifically, current source 110A3 and transistor 120A3 are electrically connected to ammeter 130, which is electrically connected via the return line 134 to current source 110A3.

Current source 110A2 and transistor 120A2 are electrically coupled to ammeter 130, which is electrically connected via the return line 134 to current source 110A2. Current source 110A1 and transistor 120A1 are electrically connected to ammeter 130, which is electrically coupled via the return line 134 to current source 110A1.

Similarly, current source 110B4 and transistor 120B4 are electrically coupled to ammeter 130, which is electrically connected via the return line 134 to current source 110B4. Current source 110B3 and transistor 120B3 are also electrically coupled to ammeter 130, which is electrically connected via the return line 134 to current source 110B3.

Current source 110B2 and transistor 120B2 are electrically connected to ammeter 130, which is electrically connected via the return line 134 to current source 110B2. Current source 110B1 and transistor 120B1 are electrically coupled to ammeter 130, which is electrically connected via the return line 134 to current source 110B1.

The foregoing connections result in eight branches each of which includes a current source and an ammeter. Specifically, as shown, branch A4 includes current source 110A4 and transistor 120A4. Branch A3 includes current source 110A3 and transistor 120A3. Branch A2 has current source 110A2 and transistor 120A2 while branch A1 has current source 110A1 and transistor 120A1.

Branch B4 has current source 110B4 and transistor 120B4. Branch B3 includes current source 110B3 and transistor 120B3. Branch B2 has current source 110B2 and transistor 120B2 while branch B1 has current source 110B1 and transistor 120B1.

All of the branches are in parallel with one another; and each branch is in series with ammeter 130. Although not shown, other branches and connections known to those of ordinary skill in the art may be included.

In one embodiment, when current source 110A4 is capable of (but need not) providing a constant direct current of 8 mA, current source 110A3 is capable of providing a constant direct current of 4 mA, while current source 110A2 is capable of providing a constant direct current of 2 mA and current source 110A1 is capable of providing a constant direct current of 1 mA.

In accordance with advantages of the present invention, the amperage values of the current sources are in binary progression (X, 2X, 4X, 8X) beginning with the current source 110A1 having the lowest detectable amperage X. The remaining current sources (110A2, 110A3, 110A4) providing outputs that increase in binary progression (2X, 4X, 8X).

Referring now to FIG. 1, when current source 110B4 is capable of (but need not) provide a constant direct current of 8 mA, current source 110B3 can provide a constant direct current of 4 mA, while current source 110B2 can provide a constant direct current of 2 mA and current source 110B1 may provide a constant direct current of 1 mA. In accordance with advantages of the present invention, the amperage values of the current sources are in binary progression (X, 2X, 4X, 8X) beginning with the current source 110B1 having the lowest detectable amperage X. The remaining current sources (110B2, 110B3, 110B4) providing outputs that increase in binary progression (2X, 4X, 8X).

Thus, the eight current sources 110A4, 110A3, 110A2, 110A1, 110B4, 110B3, 110B2, and 110B1 are capable of providing constant direct currents of 8 mA, 4 mA, 2 mA, 1 mA, 8 mA, 4 mA, 2 mA, and 1 mA, respectively. Ammeter 130 is configured to measure the current flowing through it and display the value in decimal of the current flowing through it and in the same amperage unit of mili-Amp (i.e., mA).

In one embodiment, each of the transistors 120 is a conventional N-channel MOSFET (Metal Oxide Semiconductor Field Effect Transistor) referred to as an NMOS transistor that be in an on or off state. In the on state, the voltage applied to each transistor gates 125 of transistors 120 is sufficiently high so that current flows through the applicable transistor. This on state is represented with a 1 on gate 125. Further, this 1 state, as referred to with reference to the remainder of this disclosure, means that a 1 is being applied to gate 125, so that the transistor is on. As an example, when a 1 is applied to gate 125 of transistor 120A4, the transistor is on.

Also, each of the transistors 120 is off when the voltage applied to the transistor's gate 125 is sufficiently low. This condition is represented by a 0 next to gate 125, or in other words, a 0 being applied to gate 125. For instance, transistor 120A1 is off because a 0 is applied to its gate 125.

In FIG. 1, in operation, adding circuit 100 may be used to add two 4-bit binary numbers, each 4-bit binary number being referred to as a binary operand. One skilled in the art will understand that the operation described herein is exemplary and is applicable only to the two 4-bit binary operands herein.

Here, the first binary operand is 1110 having a decimal equivalent of 14, while the second binary operand is 1011 with a decimal equivalent of 11. As can be seen, the fourth bit from right to left of the first primary operand is 1. This fourth bit, the most significant bit is herein referred to as bit (4). The third bit from right to left, referred to as bit (3) is a 1. The second bit from right to left, herein bit (2) is a 1 while the first bit from right to left, herein bit (1) is a 0. Bit (1) represents the least significant bit.

As can be seen, the fourth bit from right to left of the second binary operand 1011 is 1. This fourth bit, the most significant bit is herein referred to as bit (4). The third bit from right to left, referred to as bit (3) is 0. The second bit from right to left, herein bit (2) is 1 while the first bit from right to left, herein bit (1) is 1. Bit (1) represents the least significant bit.

First binary operand 1110 is applied to the leftmost transistors 120A4, 120A3, 120A2, and 120A1, while the second binary operand 1011 is applied to the rightmost transistors 120B4, 120B3, 120B2, and 120B1. More specifically, first binary operand 1110 is applied to transistors 120A4, 120A3, 120A2, and 120A1 as follows. Bit (4), a 1, is applied to gate 125 of transistor 120A4. Bit (3), a 1, is applied to gate 125 of transistor 120A3. Bit (2), a 1, is applied to gate 125 of transistor 120A2 and bit (1), a 0, is applied to gate 125 of transistor 120A1.

The second binary operand 1011 may be applied to transistors 120B4, 120B3, 120B2, and 120B1 in a similar manner. More specifically, bit (4), a 1, is applied to gate 125 of transistor 120B4. Bit (3), a 0, is applied to gate 125 of transistor 120B3. Bit (2), a 1, is applied to gate 125 of transistor 120B2. Bit (1), a 1, is applied to gate 125 of transistor 120B1.

With first binary operand 1110 being applied to the leftmost transistors 120A4, 120A3, 120A2, and 120A1 as described above, transistors 120A4, 120A3, 120A2, and 120A1 are on, on, on, and off, respectively. Since transistor 120A4 is on, current source 110A4 sends a current of 8 mA through transistor 120A4. Transistor 120A3 is similarly on, so current source 110A3 sends a current of 4 mA through transistor 120A3. Transistor 120A2 is also on, thus current source 110A2 sends a current of 2 mA through. However, transistor 120A1 is off, such that no current flows through transistor 120A1. In other words, the four currents flowing through the four transistors 120A4, 120A3, 120A2, and 120A1 are 8 mA, 4 mA, 2 mA, and 0 mA, respectively.

In accordance with advantages of the present invention, the amperage values of the current sources that are applied to the transistors are in binary progression (X, 2X, 4X, 8X) beginning with the first current source 110A1 having the lowest detectable amperage X. The remaining current sources provide outputs that increase in binary progression (2X, 4X, 8X). Advantageously, although the current sources are capable of passing amperage values that are in binary progression, the current flow through the transistors depend upon the bit values of the operands that are applied to the transistors.

One skilled in the art would understand that different current values may be utilized so long as such values maintain a binary progression. Moreover, the present disclosure is not limited to using current values. One skilled in the art would recognize that the present disclosure may utilize any variable quantity. For example, different applicable pressure variations that are binary progression may be utilized.

Similarly, with the second binary operand 1011 being applied to the rightmost transistors 120B4, 120B3, 120B2, and 120B1 as described above, the transistors 120B4, 120B3, 120B2, and 120B1 are on, off, on, and on, respectively. Since transistor 120B4 is on, current source 110B4 sends a current of 8 mA through transistor 120B4. With transistor 120B3 being off, no current flows through transistor 120B3. With transistor 120B2 being on, current source 110B2 sends a current of 2 mA through transistor 120B2. With transistor 120B1 being on, current source 110B1 sends a current of 1 mA through transistor 120B1. In other words, the four currents flowing through the four transistors 120B4, 120B3, 120B2, and 120B1 are 8 mA, 0 mA, 2 mA, and 1 mA, respectively.

An advantage of the present disclosure, therefore, is the self-summing nature of all of the currents flowing through the transistors. Each of the individual currents through each transistor 120 are combined and the sum displayed by ammeter 130. As a result, the displayed sum is 8 mA+4 mA+2 mA+0 mA+8 mA+0 mA+2 mA+1 mA=25 mA. Therefore, ammeter 130 displays the value "25". The value "25" represents the sum in decimal of the first and second binary operands (1110+1011=11001), i.e., (14+11=25). Ammeter 130 is used to display the sum in decimal "25" of the two binary operands. In other words, the adding circuit 100 receives the two binary operands as input, computes their sum and then displays the sum "25" (in decimal) on ammeter 130.

In general, for any two binary operands, the decimal value of the bit applied to a transistor 120 is equal to the value in mA of the electric current flowing through that transistor 120. Further, when the transistor is on, the current flows through, and if the transistor is off, no current is passed. As a first example, the decimal value of the bit (4) applied to transistor 120A4 is $1*2^{i-1}=1*2^{4-1}=8$, where i is the position of the bit in the operand from right to left, while the value in mA of the electric current flowing through transistor 120A4 is 8 mA. Therefore, the decimal value of the bit (4) applied to the transistor 120A4 is equal to the value in mA of the electric current flowing through the transistor 120A4.

As a second example, similarly, the decimal value of the bit (2) applied to transistor 120B2 ($1*2^{2-1}=2d$) is equal to the value in mA of the electric current flowing through that transistor 120B2 (2 mA). As a third example, the decimal value of the bit (3) applied to transistor 120B3 ($0*2^{3-1}=0d$) is in equal to the value in mA of the electric current flowing through that transistor 120B3 (0 mA).

With the decimal value of the bit applied to a transistor 120 being equal to the value in mA of the electric current flowing through that transistor 120, the sum of the eight decimal values of the eight bits is equal to the sum of the eight values in mA of the eight electric currents flowing through the eight transistors. But the sum of the eight decimal values of the eight bits turns out to be the sum in decimal of the two binary operands, and the sum of the eight values in mA of the eight electric currents flowing through the eight transistors is equal to the value in decimal of the combined current flowing through ammeter 130. Therefore, when ammeter 130 displays the decimal value of the combined current flowing through it, ammeter 130 in effect displays the sum in decimal of the two binary operands. In other words, the adding circuit 110 receive as input any two 4-bit binary operands, computes their sum, then displays their sum in decimal using ammeter 130.

Figure 2B:
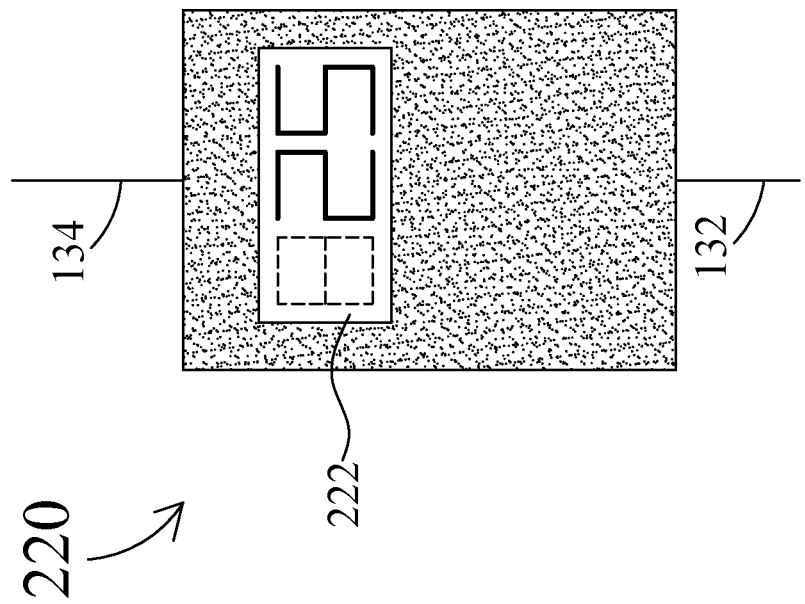
FIG. 2B illustrates another embodiment of the ammeter of the adding circuit of FIG. 1.
Figure 2A:
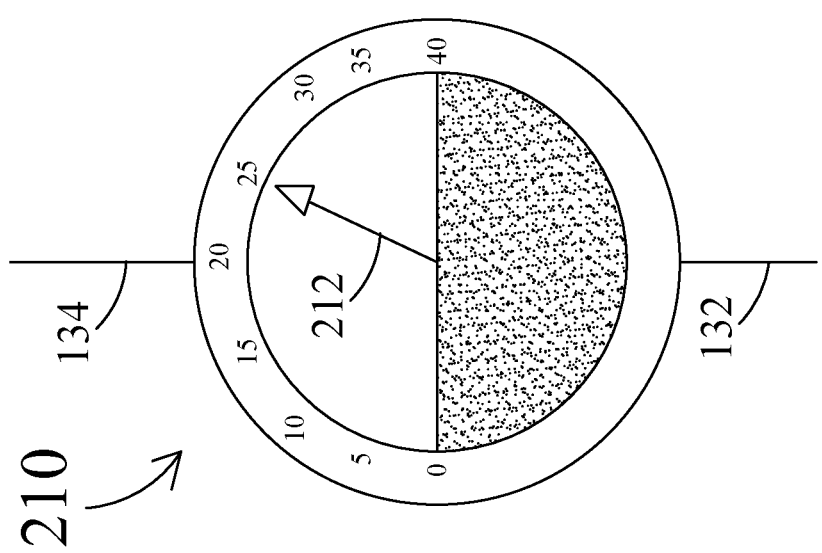
FIG. 2A illustrates an embodiment of the ammeter of the adding circuit of FIG. 1.

FIG. 2A illustrates an analog ammeter 210 that replaces ammeter 130 of FIG. 1 in accordance with an exemplary embodiment of the present disclosure.

In FIG. 2A, with the combined current of 25 mA flowing through analog ammeter 210, needle 212 indicates a value "25." A user can then observe that the sum of the two binary operands 1110 and 1011 is 25 (decimal).

FIG. 2B illustrates a digital ammeter 220 in lieu of ammeter 130 of FIG. 1 in accordance with an exemplary embodiment of the present disclosure.

In FIG. 2B, with the combined current of 25 mA flowing through it, the digital ammeter 220 displays "25" on its display screen 222. Thus, a user can observe that the sum in decimal of the two binary operands 1110 and 1011 is 25.

Figure 3:
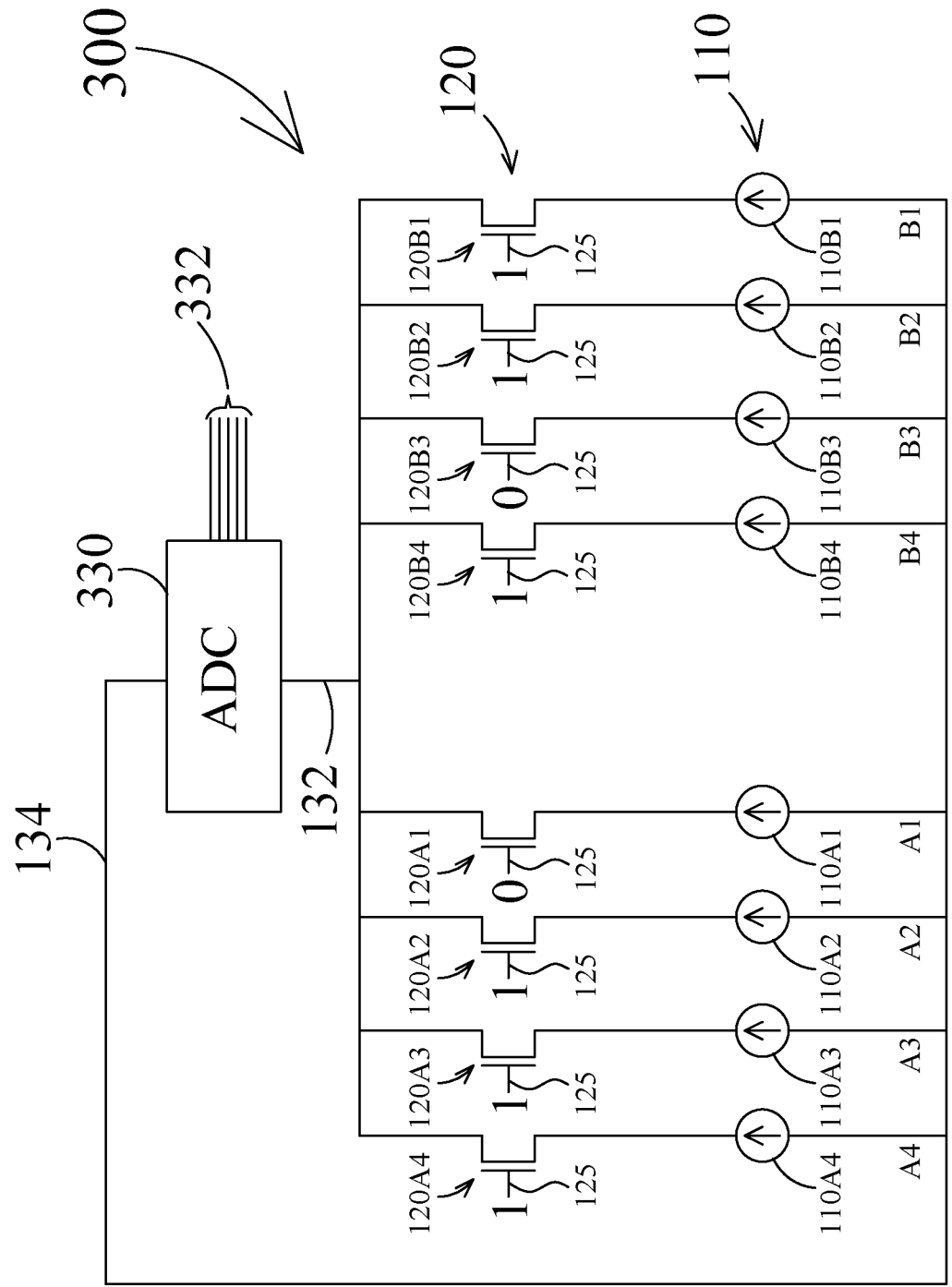
FIG. 3 illustrates an alternate adding circuit in accordance with embodiments of the present disclosure.

FIG. 3 illustrates an alternate adding circuit 300, in accordance with embodiments of the present disclosure.

In FIG. 3, more specifically, adding circuit 300 and adding circuit 100 (FIG. 1) are similar, however, an Analog to Digital Conversion (ADC) circuit 330 replaces ammeter 130 of FIG. 1. Here, ADC circuit 330 receives as input the combined current sum 25 mA and outputs a corresponding 5-bit output signal on output lines 332.

Here, the corresponding 5-bit output signal is 11001, which is the binary sum of binary operands 1110 and 1011. Thus, adding circuit 300 is a binary adder that receives as input two binary operands via gate lines 125 and generates their binary sum as output on the output lines 332. In one embodiment, the 5-bit output signal 11001 on output lines 332 may be fed to a digital processor (not shown) for further processing.

In summary, in FIGS. 1 and 3, when the eight bits of the two 4-bit binary operands are applied to the eight transistors 120 of the adding circuits 100/300, transistor 120 is on when the applied bit is 1 and off when the applied bit is 0. Transistor 120 is electrically connected to current source 110 capable of providing an electric current of $2^{i-1}$ mA, where i is the position (in the operand) of the bit that is applied to said transistor 120. As a result, the electric current flowing through transistor 120 has a value of (a) $2^{i-1}$ mA if said transistor 120 is on, and (b) 0 mA if said transistor 120 is off.

Therefore, the decimal value of the bit applied to a transistor 120 is equal to the value in mA of the electric current flowing through that transistor 120 (equation E). This equation (E) may be written for the eight transistors 120, resulting in eight equations (Ei), i=1, . . . , 8. It should be noted that adding the right sides of the eight equations (Ei), i=1, . . . , 8 yields the value in mA of the combined current flowing through the electrically conductive line 132, whereas adding the left sides of the eight equations (Ei), i=1, . . . , 8 yields the sum in decimal of the two binary operands. Thus, the value in decimal of the combined current is equal to the sum in decimal of the two binary operands.

Therefore, in FIG. 1, when ammeter 130 displays the value in decimal of the combined current flowing through it, ammeter 130 in effect displays the sum in decimal of the two binary operands. In other words, the adding circuit 100 receives and adds two binary operands and display their sum in decimal.

In FIG. 3, the value of the combined current may be converted by ADC circuit 330 into a binary output signal which is also the binary sum of the two binary operands. As a result, the adding circuit 300 plays the role of a binary adder that receives and adds two binary operands and outputs their binary sum. This binary sum may be fed to a digital processor for further processing.

In conventional systems, the addition of two 4-bit binary operand requires four full adders, with increasing complexity as the number of bits of the binary operands increase. Unlike conventional systems with such increasing complexity, adding circuit 100 (FIG. 1, for example) of the present disclosure, utilizes only eight current sources 110 and eight transistors 120 which can be implemented using fewer logic gates. As a result, the present disclosure provides an adding circuit that reduces components, enables faster computation relative to conventional systems.

In FIGS. 1 and 3, one of ordinary skill in the art will realize that the number of branches of each of the first and second binary operand portions can vary based on the number of bits in each operand. As such, the first binary operand portion may have M branches and the second binary operand portion may have N branches, where M and N are positive integers (M and N can be the same but need not). Thus, the first binary operand portion may receive an M-bit binary operand, and the second binary operand portion may receive an N-bit binary operand.

As an example, M might be 5 while N is 4. That is, a fifth branch (not shown) may be added to the first binary operand portion of the adding circuit 100/300 so that the first binary operand portion can receive as input a 5-bit binary operand in the range of 00000-11111 (i.e., 0-31). The added fifth branch and be similar and branch A4 might be similar except that the current source for fifth branch is capable of providing a direct current of $2^{5-1}$=16 mA. The transistor gate for the fifth branch receives the most significant bit (i.e., bit (5) of the 5-bit binary operand. The operation of the adding circuit 100/300 with M=5 and N=4 is similar to that with M=N=4 as described above.

In the embodiments described above, the amperage unit is mili-Amp (mA). In general, the adding circuit 100/300 can operate with amperage unit being mili-Amp (mA), micro-Amp (µA), pico-Amp (pA), or any other amperage unit. For instance, if the amperage unit is to be micro-Amp (µA), then the current sources 110A4, 110A3, 110A2, 110A1, 110B4, 110B3, 110B2, and 110B1 are capable of providing direct currents of 8 µA, 4 µA, 2 µA, 1 µA, 8 µA, 4 µA, 2 µA, and 1 µA, respectively. Accordingly, ammeter 130 (FIG. 1) is configured to measure currents in µA so as to correctly display the sum in decimal of the two binary operands. The ADC circuit 330 (FIG. 3) is configured to convert the value of the combined current in µA so as to make correct conversions.

In the embodiments described above, transistors 120 operate as switches. Said switches may be on or off depending upon the operand bit applied to the switch. However, one skilled in the art will understand that other types of switches can be utilized. For instance, mechanical switches that are manually operable may be used. A user may manually turn each of the eight mechanical switches 120 on, 1 or off, 1 to represent the values of binary operands.

In the embodiments described above, the adding circuit 100/300 includes two operand portions for adding two binary operands. In general, the adding circuit 100/300 may have K operand portions (K is an integer greater than 0). The case of K=2 is described in the embodiments above.

For K=3, adding circuit 100/300 includes a third operand portion (similar to the first or second binary operand portion). The third operand portion may receive third binary operand inputs in addition to the first and second binary operand portions receiving first and second binary operands. Adding circuit 100/300 adds the first, second, and third binary operands and then displays their sum on ammeter 130 or outputs the binary output signal on output lines 332 (FIG. 3). Output lines 332 may include a sixth line because the binary sum of the three binary operands may have 6 bits (assuming the third operand portion also has four branches).

For K=1, adding circuit 100/300 includes a single operand portion and is therefore equivalent to adding zero to the single operand. In essence, here, adding circuit 100/300 converts the single binary operand into a decimal number and displays the decimal number using ammeter 130 (FIG. 1).

In the embodiments described above, electric current is the variable quantity for adding binary operands. However, one of ordinary skill in the art will realize that other types of variable quantities may be employed. As an example, liquid flow rate might be employed for adding the binary operands.

As another example, gas flow rate might be employed. Other examples without limitation may be wave frequency, wave amplitude, etc.

When liquid flow rate is used as a variable quantity for example, eight liquid pumps replace the eight current sources 110 of FIG. 1. The eight liquid pumps 110A4, 110A3, 110A2, 110A1, 110B4, 110B3, 110B2, and 110B1 are capable of pumping 8 cc/s (cubic centimeter per second), 4 cc/s, 2 cc/s, 1 cc/s, 8 cc/s, 4 cc/s, 2 cc/s, and 1 cc/s of a liquid, respectively. Eight corresponding valves replace the eight transistors 120 to function as switches. When an operand bit 1 is applied, the valve 120 opens, allowing the liquid to flow through the valve. When an operand bit 0 is applied, valve 120 closes to prevent liquid flow.

In FIG. 1, a tube, pipe or other material for conveying liquids may replace electrically conductive lines 132, 134, a liquid flow meter may replace ammeter 130. In FIG. 3, an ADC device may be used in place of the ADC circuit 330.

In operation, an adding device 100/300 based on variable liquid flow rate is similar to the operation of adding circuit 100/300 based on electron flow rate (i.e., electric current). More specifically, the operation of the adding device 100/300 based on the variable of liquid flow rate is as follows. In the example above, the eight bits of the two binary operands 1110 and 1011 are applied to the eight valves 120 causing the eight valves 120A4, 120A3, 120A2, 120A1, 120B4, 120B3, 120B2, and 120B1 to be open, open, open, close, open, close, open, and open, respectively.

As a result, the fluid flow rates going through the eight valves 120A4, 120A3, 120A2, 120A1, 120B4, 120B3, 120B2, and 120B1 are 8 cc/s, 4 cc/s, 2 cc/s, 0 cc/s, 8 cc/s, 0 cc/s, 2 cc/s, and 1 cc/s, respectively. Then, the eight liquid flows from the eight valves are merged into a combined liquid flow of 25 cc/s going to liquid conveying pipe 132.

In FIG. 1, the combined liquid flow of 25 cc/s is measured by the liquid flow meter 130, displaying the value "25" the sum of the two binary operands. Similarly, in FIG. 3, the value of the combined liquid flow of 25 cc/s is converted by the ADC device 330 into a 5-bit binary output signal 11001, which may be fed to a digital processor for further processing.

While particular embodiments of the present disclosure have been described herein for purposes of illustration, many modifications and changes will become apparent to those skilled in the art. Accordingly, the appended claims are intended to encompass all such modifications and changes as fall within the true spirit and scope of this disclosure.

The invention claimed is:

1. An adding circuit comprising:
an electrically conductive line; and
M operand portions (i), i=1, . . . , M,
wherein, for each of i=1, . . . , M, the operand portion (i) comprises Ni branches which include branches (i,j), j=1, . . . , Ni, wherein Ni is an integer greater than 0,
wherein all the branches (i,j), i=1, . . . , M and j=1, . . . , Ni, are electrically in parallel with one another and electrically connected to the electrically conductive line,
wherein, for i=1, . . . , M and j=1, Ni, the branch (i,j) includes (a) a current source (i,j) and (b) a switch (i,j) electrically in series with the current source (i,j), and
wherein, for i=1, . . . , M and j=1, . . . , Ni, the current source (i,j) is configured to send a direct current (i,j) through the switch (i,j) to the electrically conductive line, the direct current (i,j) having a value of (a) $2^{j-1}$ in a same amperage unit if the switch (i,j) is on, and (b) zero if the switch (i,j) is off.

2. The adding circuit of claim 1, wherein for i=1, . . . , M and j=1, . . . , Ni, the switch (i,j) comprises a transistor (i,j).

3. The adding circuit of claim 1, wherein for i=1, . . . , M and j=1, . . . , Ni, the switch (i,j) comprises a mechanical switch (i,j).

4. The adding circuit of claim 1, further comprising an ammeter which is
(a) electrically connected to all the branches (i,j), i=1, . . . , M and j=1, . . . , Ni, via the electrically conductive line, and
(b) configured to display a decimal value of a current flowing through the ammeter and in the same amperage unit.

5. The adding circuit of claim 4, wherein M=2 and N1=N2.

6. The adding circuit of claim 1, further comprising an analog to digital conversion (ADC) circuit which is
(a) electrically connected to all the branches (i,j), i=1, . . . , M and j=1, . . . , Ni, via the electrically conductive line, and
(b) configured to generate a binary output signal which is equal to a decimal value of a current flowing through the ADC circuit and in the same amperage unit.

7. The adding circuit of claim 6, wherein M=2 and N1=N2.

8. A method for adding M binary operands, wherein M is an integer greater than 0, wherein the M binary operands includes binary operands (i), i=1, . . . , M, wherein for i=1, . . . , M, the binary operand (i) has Ni bits including bits (i,j), j=1, . . . , Ni, from right to left, wherein Ni is an integer greater than 0, the method comprising:
for i=1, . . . , M and j=1, . . . , Ni, applying the bit (i,j) to a switch (i,j) wherein the switch (i,j) is configured to be on if the bit (i,j) is 1, and off if the bit (i,j) is 0; and
for i=1, . . . , M and j=1, . . . , Ni, sending a direct current (i,j) through the switch (i,j), the direct current (i,j) having a value of (a) $2^{j-1}$ in a same amperage unit if the switch (i,j) is on, and (b) zero if the switch (i,j) is off; and
merging all the direct currents (i,j), i=1, . . . , M and j=1, . . . , Ni into a combined current on an electrically conductive line.

9. The method of claim 8, wherein for i=1, . . . , M and j=1, . . . , Ni, the switch (i,j) comprises a transistor (i,j) with its gate receiving the bit (i,j).

10. The method of claim 8, wherein for i=1, . . . , M and j=1, . . . , Ni, said sending the direct current (i,j) through the switch (i,j) comprises using a current source (i,j) which is (a) electrically connected to the switch (i,j) and (b) capable of sending a current having a value of $2^{j-1}$ in the same amperage unit.

11. The method of claim 8, further comprising using an ammeter to (a) receive the combined current from the electrically conductive line, and (b) display a decimal value of the combined current in the same amperage unit.

12. The method of claim 11, wherein M=2 and N1=N2.

13. The method of claim 8, further comprising using an analog to digital conversion (ADC) circuit to (a) receive the combined current from the electrically conductive line, and (b) generate a binary output signal which is equal to a decimal value of the combined current in the same amperage unit.

14. The method of claim 13, wherein M=2 and N1=N2.

15. A method for adding M binary operands based on a variable in a variable unit, M being an integer greater than 0, the M binary operands including binary operands (i), i=1, . . . , M, wherein for i=1, . . . , M, the binary operand (i) has Ni bits including bits (i,j), j=1, . . . , Ni, from right to left, wherein Ni is an integer greater than 0, the method comprising:

for i=1, . . . , M and j=1, . . . , Ni, applying the bit (i,j) to a switch (i,j) wherein the switch (i,j) is configured to be on if the bit (i,j) is 1, and off if the bit (i,j) is 0;

for i=1, . . . , M and j=1, . . . , Ni, moving a quantity (i,j) of the variable through the switch (i,j), wherein the quantity (i,j) has a value of (a) $2^{j-1}$ in the variable unit if the switch (i,j) is on, and (b) zero if the switch (i,j) is off; and merging all the quantities (i,j), i=1, . . . , M and j=1, . . . , Ni, into a combined quantity of the variable in the variable unit.

16. The method of claim 15, further comprising using a meter to (a) receive the combined quantity of the variable and (b) display a decimal value of the combined quantity of the variable in the variable unit.

17. The method of claim 16, wherein M=2 and N1=N2.

18. The method of claim 15, further comprising using an analog to digital conversion (ADC) device to (a) receive the combined quantity of the variable and (b) generate a binary output signal which is equal to a decimal value of the combined quantity of the variable in the variable unit.

19. The method of claim 18, wherein M=2 and N1=N2.

20. The method of claim 15, wherein the variable is liquid flow rate, wherein for i=1, . . . , M, and j=1, . . . , Ni, the switch (i,j) comprises a valve (i,j), and wherein for i=1, . . . , M, and j=1, . . . , Ni, said moving the quantity (i,j) of the variable through the switch (i,j) comprises using a liquid pump (i,j) which is capable of pumping $2^{j-1}$ of a same liquid flow rate unit of a same liquid.

* * * * *